(12) United States Patent
Suzuki

(10) Patent No.: US 7,301,101 B2
(45) Date of Patent: Nov. 27, 2007

(54) FLAT CABLE CLAMP

(75) Inventor: Kaoru Suzuki, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/480,472

(22) Filed: Jul. 5, 2006

(65) Prior Publication Data

US 2007/0007029 A1    Jan. 11, 2007

(30) Foreign Application Priority Data

Jul. 6, 2005    (JP) .......................... P2005-197862

(51) Int. Cl.
  *H02G 3/04*    (2006.01)
(52) U.S. Cl. .................. 174/68.1; 174/68.3; 174/72 A; 174/117 F; 174/135; 248/68.1; 24/458
(58) Field of Classification Search ............... 174/68.1, 174/68.3, 72 A, 72 R, 95–101, 117 F, 117 FF, 174/135; 248/49, 68.1, 71, 73, 74.1, 74.2, 248/74.3; 24/458, 545
See application file for complete search history.

(56) References Cited

U.S. PATENT DOCUMENTS

| | | | |
|---|---|---|---|
| 4,356,599 A * | 11/1982 | Larson et al. ............. 24/16 PB |
| 4,457,482 A * | 7/1984 | Kitagawa ................... 248/74.3 |
| 4,650,925 A * | 3/1987 | Coldren ....................... 174/135 |
| 4,669,156 A * | 6/1987 | Guido et al. ................ 248/74.3 |
| 5,160,812 A * | 11/1992 | Takahashi et al. ........... 174/135 |
| 5,401,905 A * | 3/1995 | Lesser et al. ............. 174/99 R |
| 5,820,048 A * | 10/1998 | Shereyk et al. ............. 248/74.1 |
| 5,937,745 A * | 8/1999 | Boe ............................ 174/135 |
| 6,561,465 B2* | 5/2003 | Kondo ....................... 248/74.3 |
| 6,575,411 B1* | 6/2003 | Serizawa et al. .............. 248/49 |
| 6,809,257 B2* | 10/2004 | Shibuya ....................... 174/481 |

FOREIGN PATENT DOCUMENTS

| JP | 6-275966 A | 9/1994 |
|---|---|---|
| JP | 08-119304 A | 5/1996 |

* cited by examiner

*Primary Examiner*—Dhiru R. Patel
(74) *Attorney, Agent, or Firm*—Sughrue Mion, PLLC

(57) ABSTRACT

To provide a flat cable clamp which can not only prevent breakage of a hinge but also limit a bending direction of the hinge, First and second protective protrusions 36, 43 are disposed in the vicinity of both side edge surface 26, 27 of first and second thin-walled hinges 14, 15 so as to be opposed to the both side edge surfaces 26, 27 of the first and second thin-walled hinges 14, 15, respectively. The first and second hinge protective protrusions 36, 43 limit bending directions of the first and second thin-walled hinges 14, 15, on the occasion that first and second covers 12, 13 engage with a clamp main body 11 so as to clamp down a flat cable 60 between the first and second covers 12, 13 and the clamp main body 11.

4 Claims, 6 Drawing Sheets

FLAT CABLE CLAMP

BACKGROUND OF THE INVENTION

1. Field of the Invention

This invention relates to a flat cable clamp which is used for fixing a flat cable having flexibility such as FFC(i.e., Flexible Flat Cable) and a ribbon electric cable, to a body to be mounted such as a car body panel.

2. Description of the Related Art

As one of a conventional flat cable clamp, such a thing that a flat cable is clamped down by 2 pieces of clamp main bodies and the flat cable is fixed to a printed board, has been known (e.g., see, JP-A-06-275966 publication).

This flat cable clamp is equipped with 2 pieces of clamp main bodies where an opening portion and a convex portion are formed. According to the flat cable clamp, it is configured in such a manner that the flat cable and the printed board are clamped down between respective surfaces of 2 pieces of the clamp main bodies where the opening portions and the convex portions are disposed, and the flat cable is fixed to the printed board by having a fastening member passed through a fixing hole.

In this flat cable clamp, a member for clamping down the flat cable, such as the clamp main body, is formed as a separate body, and therefore, a clamping work by use of those clamp main bodies is not only troublesome but also component management man-hour increases. On that account, it is conceivable that 2 pieces of clamp main bodies and a thing-walled hinge are formed integrally by synthetic resin so as to form such a flat cable clamp that the 2 pieces of the clamp main bodies are coupled by the thin-walled hinge.

In this regard, however, in case that the thin-walled hinge is simply disposed on the clamp main bodies in a bared situation, there is such a possibility that the thin-walled hinge contacts an external body such as an external electric component and is cut off at the time of using the flat cable clamp. In addition, the thin-walled hinge is easily twisted, and its bending direction is not constant, and therefore, even if the flat cable clamp is equipped with the thin-walled hinge, a complicated clamping work by use of the clamp main bodies is not improved. Therefore, there is a room for improvement.

SUMMARY OF THE INVENTION

The present invention is made in view of the above-described situation, and its objective is to provide a flat cable clamp which can not only prevent breakage of a hinge but also limit a bending direction of the hinge.

[Means for Solving the Problem]

In order to accomplish the above-mentioned objective, a flat cable clamp of the present invention is a flat cable clamp for fixing a flat cable to a body to be mounted, and has, a clamp main body having a locking portion which can be fitted in and attached to the body to be mounted, a cover which can be engaged with the clamp main body, a hinge having flexibility, which is formed integrally with the clamp main body and the cover, so as to couple the claim main body and the cover in such a manner that they can be freely swung relatively, and a plurality of hinge protective protrusions which are formed on at least one of the claim main body and the cover, and is characterized in that the hinge protective protrusions are disposed in the vicinity of both side edge surfaces of the hinge so as to be opposed to the both side edge surfaces of the hinge, the hinge being located between the hinge protective protrusions, and the hinge protective protrusions limit a bending direction of the hinge, on the occasion that the cover engages with the clamp main body so as to clamp down the flat cable between the cover and the clamp main body.

In the flat cable clamp with the above-described configuration, since the hinge protective protrusions are disposed on the both sides of the hinge, it is possible to prevent occurrence of such a matter that the hinge contacts directly to an external body such as an external electric component and is cut off at the time of using the flat cable clamp. In addition, in the flat cable clamp with the above-described configuration, the hinge protective protrusions limits a bending direction of the hinge, i.e., function so as to allow the hinge to move only in a bending direction of the hinge which is necessary for a relative turning operation (in other words, a swinging operation) of the clamp main body and the cover for the purpose of smooth engagement of the clamp main body and the cover. Thus, according to the flat cable clamp with the above-described configuration, workability relating to engagement of the clamp main body and the cover, i.e., workability relating to clamping of the flat cable through the use of the clamp main body and the cover, is improved.

According to the present invention, it is possible to provide a flat cable clamp which can not only prevent breakage of a hinge but also limit a bending direction of the hinge.

As above, the present invention was explained in a concise manner. Further, details of the present invention will be further clarified by reading through the best mode for carrying out the invention which will be explained below, with reference to accompanying drawings.

DESCRIPTION OF THE PREFERRED EMBODIMENTS

Hereinafter, a preferred embodiment, which relates to the present invention, will be explained in detail on the basis of drawings.

Figure 1:
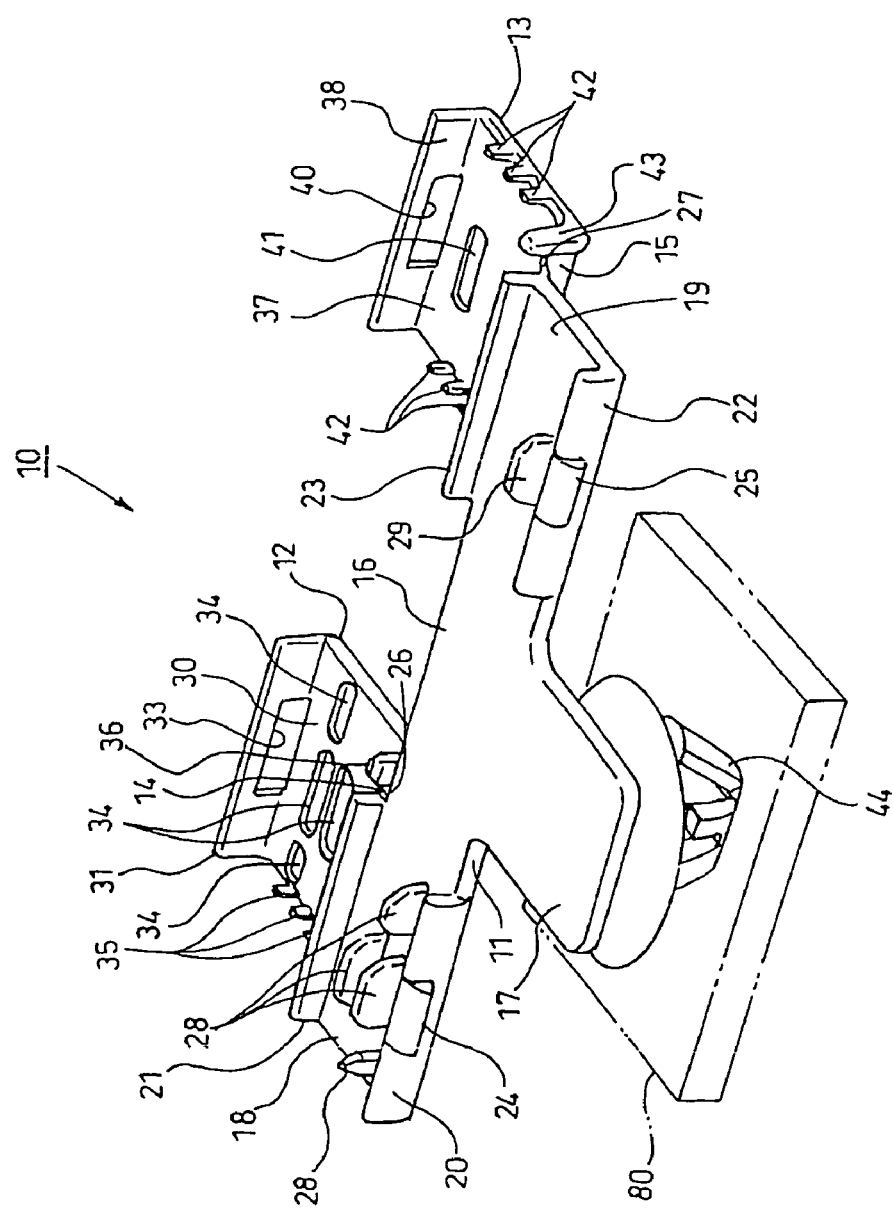
FIG. 1 is an external appearance perspective view which shows one embodiment of a flat cable clamp that relates to the present invention, in such a situation that its clamp main body and covers are expanded.
Figure 2:
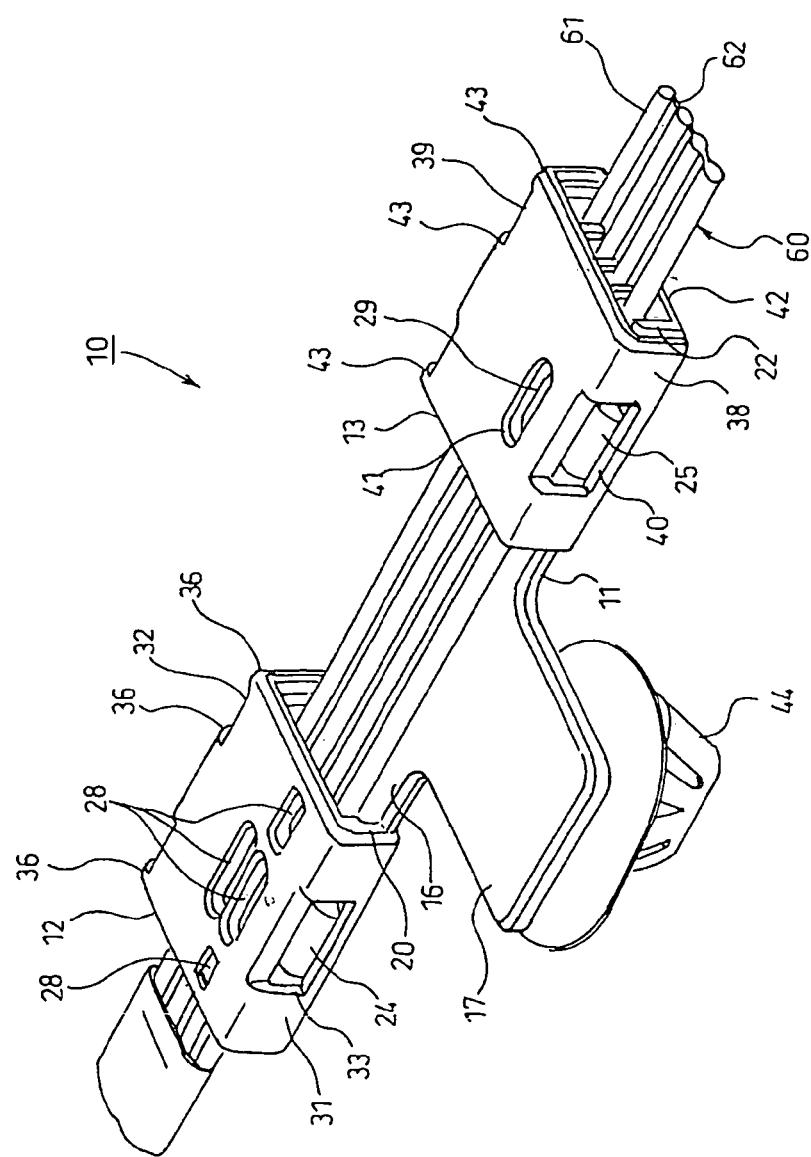
FIG. 2 is an external appearance perspective view which shows such a situation that a flat cable is clamped down by the flat cable clamp of FIG. 1.

FIG. 1 is an external appearance perspective view which shows one embodiment of a flat cable clamp that relates to the present invention, in such a situation that its clamp main body and a cover are expanded. FIG. 2 is an external appearance perspective view which shows such a situation that a flat cable is clamped down by the flat cable clamp of FIG. 1, and FIG. 3(a) is a schematic side view which shows such a situation that one of two covers of the flat cable clamp of FIG. 2 engages with a clamp main body, and FIG. 3(b) is a plan view of FIG. 3(a).

Figure 3:
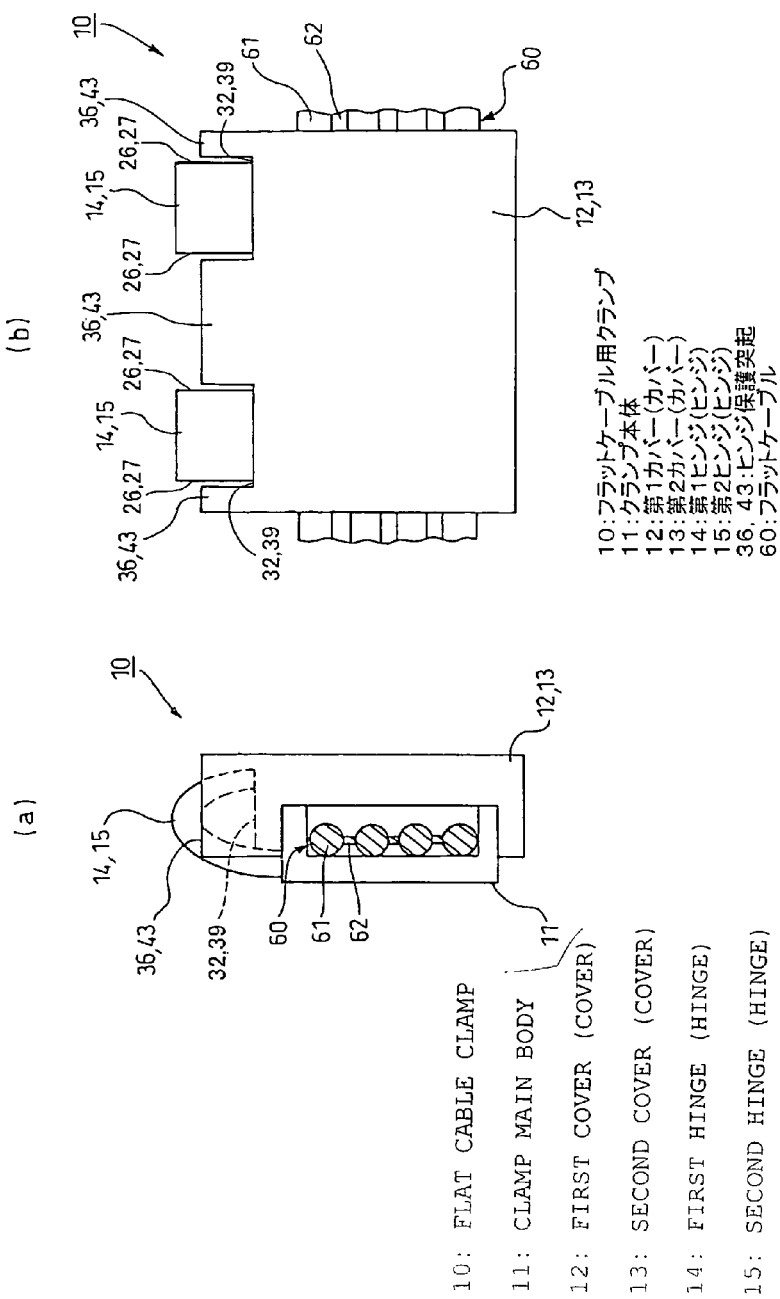
FIG. 3(a) is a schematic side view which shows such a situation that one of two covers of the flat cable clamp of FIG. 2 engages with a clamp main body.
FIG. 3(b) is a plan view of FIG. 3(a).

As shown in FIGS. 1 through 3(b), a flat cable clamp 10, which is one embodiment of the present invention, is a flat cable clamp for fixing a flat cable 60 having 4 pieces of electric wire portions 61 (see, FIGS. 2 through 3(b).), along a body to be mounted such as a car body panel 80 (see, FIG. 1.).

This flat cable clamp 10 is equipped with a clamp main body 11 having a locking portion 44 which can be fitted in and attached to a car body panel 80, first and second covers 12, 13 which can be engaged with the clamp main body 11, first and second thin-walled hinges 14, 15 having flexibility which are formed integrally with the clamp main body 11 and the first, second covers 12, 13 so as to couple the clamp main body 11 and the first, second covers 12, 13 in such a manner that they can be freely swung relatively (see, FIGS. 1, 3(a) and 3(b).), and first and second protective protrusions 36, 43 formed on the first and second covers 12, 13.

As shown in FIGS. 3(a) and 3(b), the first and second protective protrusions 36, 43 are disposed in the vicinity of both side edge surfaces 26, 27, respectively so as to be opposed to the both side edge surfaces 26, 27 of the first and second thin-walled hinges 14, 15, through the first and second thin-walled hinges 14, 15, respectively. Meanwhile, it is all right if the first and second hinge protective protrusions 36, 43 are formed on at least one of the clamp main body 11 and the first, second covers 12, 13, and for example, it is all right even if it is formed only on the clamp main body 11.

The first and second hinge protective protrusions 36, 43 limit bending directions of the first and second thin-walled hinges 14, 15, on the occasion that the first and second covers 12, 13 engage with the clamp main body 11 so as to clamp down the flat cable 60 between the covers and the clamp main body 11, respectively.

Details of the flat cable clamp 10 configured in this manner will be explained below.

The above-mentioned clamp main body 11, first and second thin-walled hinges 14, 15, first and second covers 12, 13 and first and second hinge protective protrusions 36, 43 are formed integrally by using synthetic resin as a material, and by this means, the flat cable clamp 10 is formed.

The clamp main body 11 is formed to be of a T-letter shape and be relatively thin, and has a long first plate portion 16 and a short second plate portion 17 which is connected to a center part of the first plate portion 16.

As to the first plate portion 16, its one end portion is formed in the shape of a nearly C-letter viewed from a cross-section surface, and it has a first fixing surface 18 as a bottom surface, and the other end portion is also formed in the shape of a nearly C-letter viewed from a cross-section surface, and it has a second fixing surface 19 as a bottom surface. The first and second fixing surfaces 18, 19 have pairs of guide plates 20, 21, 22, 23 which are protruded in a vertical direction from both end portions of them. An interval dimension of the guide plates 20, 21 which are extended in parallel to each other, and an interval dimension of the guide plates 22, 23 which are extended in parallel to each other, are slightly larger than a width dimension of the flat cable 60, respectively. A locking protrusion 24, which is used for locking the first cover, is formed on a lateral surface of the guide plate 20 on the side of the second plate portion 17 so as to be protruded therefrom, and a locking protrusion 25, which is used for locking the second cover, is formed on a lateral surface of the guide plate 22 on the side of the second plate portion 17 so as to be protruded therefrom.

4 pieces of positioning protrusions 28, 28, 28, 28 are formed on the fist fixing surface 18 so as to be protruded therefrom. These positioning protrusions 28, 28, 28, 28 are disposed so as to be in tune with positions of slit-shaped positioning cutouts (not shown in the figure) of a bridge portion 62 formed integrally so as to couple electric wire portions 61 of the flat cable 60 at intervals.

1 piece of a positioning protrusion 29 is formed on the second fixing surface 19 so as to be protruded therefrom. The positioning protrusion 29 is disposed so as to be in tune with a position of a slit-shaped positioning cutout (not shown in the figure) of a bridge portion 62 of the flat cable 60.

The first cover 12 has a rectangular first pressing surface 30 as a bottom surface, and has a pair of guide plates 31, 32 which are protruded in a vertical direction from its both end portions, and is formed in the form of a nearly C-letter viewed from a cross-section surface. An interval dimension of the guide plates 31, 32, which are protruded in parallel to each other, is slightly larger than an interval dimension of the guide plates 20, 21.

2 pieces of first thin-walled hinges 14 are formed integrally in parallel to each other, between a lateral surface of a base end portion (i.e., a root portion) of the guide plate 32 and a lateral surface of a base end portion (i.e., a root portion ) of the guide plate 21. Meanwhile, an engagement hole 33, which engages with a locking protrusion 24 formed on a lateral surface of the guide plate 20, is formed in the guide plate 31.

4 pieces of protrusion holding portions 34, 34, 34, 34 are formed on the first pressing surface 30 so as to pass through it. The 4 pieces of protrusion holding portions 34, 34, 34, 34 engage with the positioning protrusions 28, 28, 28, 28 on the first fixing surface 18, respectively, on the occasion that the first cover 12 is overlaid on the clamp main body 11. In addition, 3 pieces of electric wire holding-down protrusions 35 are formed on one end portion of the fist pressing surface 30, which is extended in an orthogonal direction to the pair of guide plates 31, 32, corresponding to the number of bridge portions 62 of the flat cable 60.

3 pieces of hinge protective protrusions 36, 36, 36 are formed on a lateral surface of the guide plate 32 of the first cover 12, as shown in FIGS. 3(a) and 3(b).

The second cover 13 is of a configuration which is nearly similar to that of the first cover 12, and has a rectangular second pressing surface 37 as a bottom surface, and has a pair of guide plates 38, 39 which are protruded in a vertical direction from its both end portions, and is formed in the shape of a nearly C-letter viewed from a cross-section surface. An interval dimension of the guide plates 38, 39 which are extended in parallel to each other is slightly larger than an interval dimension of the guide plates 22, 23.

2 pieces of second thin-walled hinges 15 are formed integrally in parallel to each other, between a lateral surface of a base end portion (i.e., a root portion) of the guide plate 39 and a lateral surface of a base end portion (i.e., a root portion ) of the guide plate 23. Meanwhile, an engagement hole 40, which engages with a locking protrusion 25 formed on a lateral surface of the guide plate 22, is formed in the guide plate 38.

1 piece of a protrusion holding portion 41 is formed on the second pressing surface 37 so as to pass through it. The protrusion holding portion 41 engages with engage with the positioning protrusion 29 on the second fixing surface 19, on the occasion that the second cover 13 is overlaid on the clamp main body 11. In addition, 3 pieces of electric wire holding-down protrusions 42 are formed on one end portion of the second pressing surface 37, which is extended in an orthogonal direction to the pair of guide plates 38, 39, corresponding to the number of bridge portions 62 of the flat cable 60.

3 pieces of hinge protective protrusions 43, 43, 43 are formed on a lateral surface of the guide plate 39 of the second cover 13, as shown in FIGS. 3(a) and 3(b).

A locking portion 44, which is formed on a lower surface of the second plate portion 17 of the clamp main body 11, engages with a clamp hole (not shown in the figure) formed on the car body panel 80.

The flat cable is an electric wire generally called as FFC, in which 4 pieces of electric wire portions 61 are coupled by the bridge portion 62, but it may be a ribbon wire etc., other than FFC. As described above, the slit-shaped positioning cutout (not shown in the figure) is formed in the bridge portion 62. Meanwhile, the number of the electric wire portions 61 is selected according to the number of circuits to be applied, etc.

As shown in FIG. 2, the flat cable clamp 10 is overlaid on the clamp main body 11 after the flat cable 60 is placed on the first and second fixing surface 18, 19 of the fist plate portion 16, and the first and second covers 12, 13 are turned through the first and second thin-walled hinges 14, 15 so as to clamp down the flat cable 60 by the fist and second fixing surfaces 18, 19 and the fist and second pressing surface 30, 37.

At this time, the engagement hole 33 of the first cover 12 is engaged with the locking protrusion 24 of the guide plate 20, and then, the engagement hole 40 of the second cover 13 is engaged with the locking protrusion 25 of the guide plate 22. In addition, at this time, the positioning protrusions 28, 29 pass through the positioning cutouts (not shown in the figure) of the bridge portion 62 of the flat cable 60, and thereafter, are inserted into the protrusion holding portions 34, 41, and by this means, the flat cable 60 is positioned in its longitudinal direction, and its width direction (lined-up direction of the electric wire portions 61).

Furthermore, at this time, 3 pieces of the electric wire holding-down protrusions 35 of the fist cover 12 press the bridge portion 62 of the flat cable 60, and hold down the flat cable 60 to the fist fixing surface 18 of the clamp main body 11, and then, 6 pieces of the electric wire holding-down protrusions 42 of the second cover 13 press the bridge portion 62 of the flat cable 60 and hold down the flat cable 60 to the second fixing surface 19 of the clamp main body 11, and by this means, the flat cable 60 is positioned in the flat cable clamp 10, in its thickness direction, and fixed to the flat cable clamp 10.

Then, the locking portion 44 of the flat cable clamp 10 is fit in and attached to a clamp hole (not shown in the figure) of the car body panel 80, and thereby, the flat cable 60 is fixed to the car body panel 80.

According to this flat cable clamp 10, the first and second hinge protective protrusions 36, 43 are disposed on both sides of the first and second thin-walled hinges 14, 15, respectively, and therefore, it is possible to prevent occurrence of such a matter that the first and second hinges 14, 15 contact directly to an external body such as an external electric component and are cut off at the time of using the flat cable clamp 10.

In addition, in the flat cable clamp 10, the first and second protective protrusions 36, 43 limit bending directions of the first and second thin-walled hinges 14, 15, i.e., function so as to allow the first and second thin-walled hinges 14, 15 to move only in bending directions of the first and second thin-walled hinges 14, 15 which are necessary for a relative turning operation (in other words, a swinging operation) of the clamp main body 11 and the first and second covers 12, 13 for the purpose of smooth engagement of the clamp main body 11 and the first and second covers 12, 13.

Therefore, according to the flat cable clamp 10, workability relating to engagement of the clamp main body 11 and the first and second covers 12, 13, i.e., workability relating to clamping of the flat cable 60 through the use of the clamp main body 11 and the first and second covers 12, 13/

Figure 4:
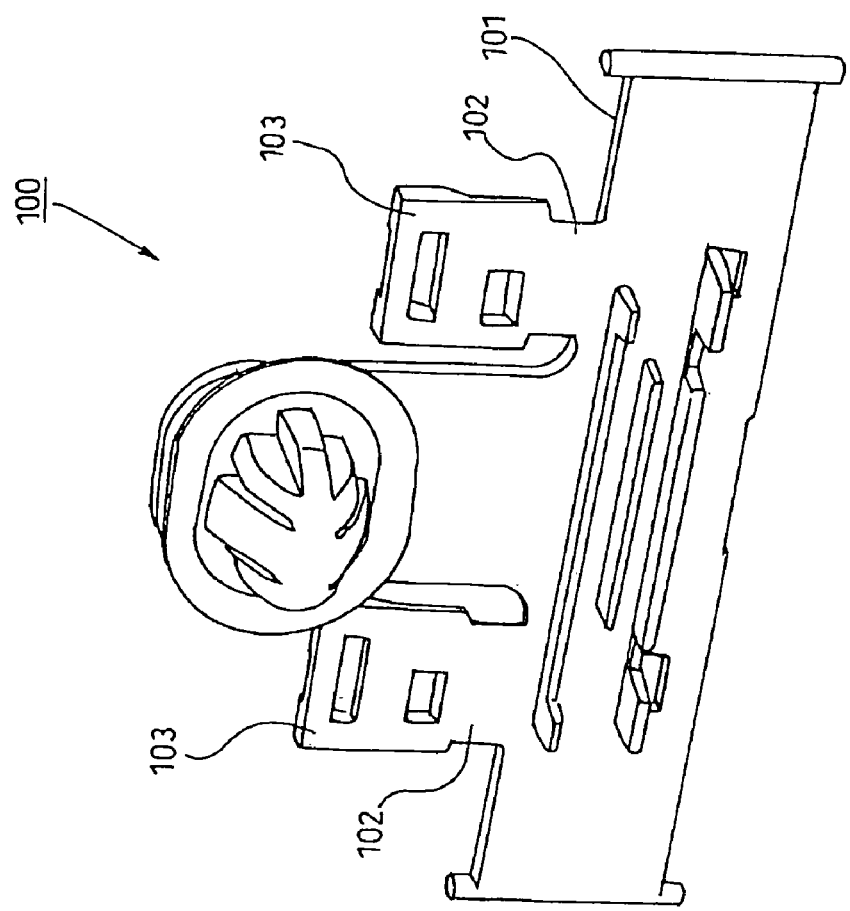
FIG. 4 is an external appearance perspective view which shows a reference example of a flat cable clamp, in such a situation that its clamp main body and covers are expanded.
Figure 5:
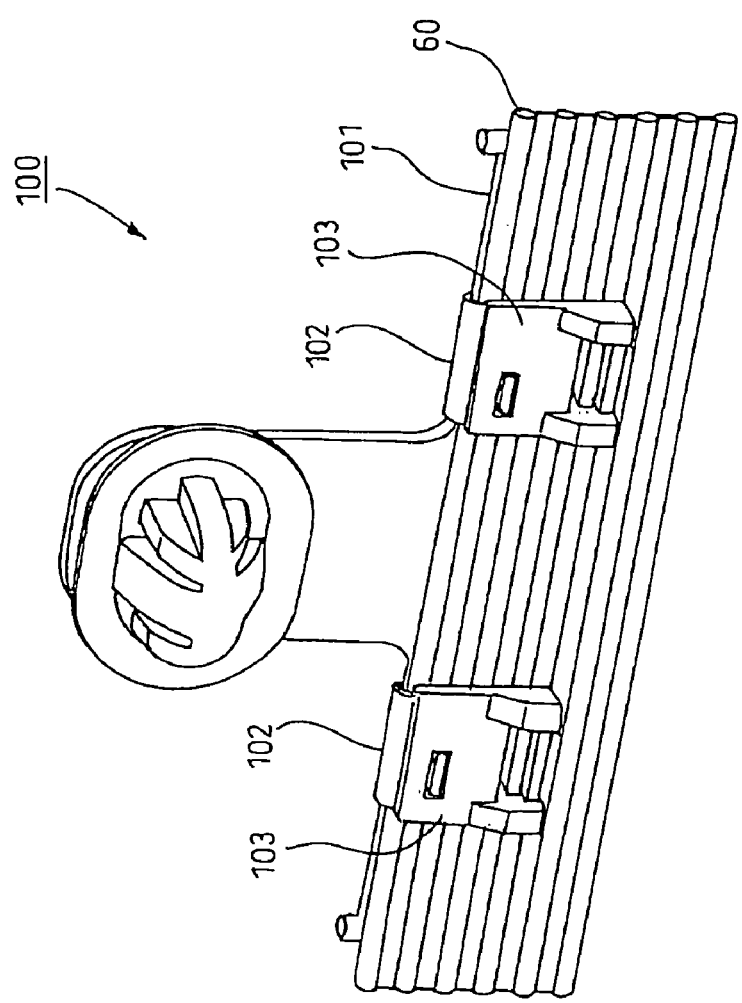
FIG. 5 is an external appearance perspective view which shows such a situation that a flat cable is clamped down by the reference example of the flat cable clamp of FIG. 4.
Figure 6:
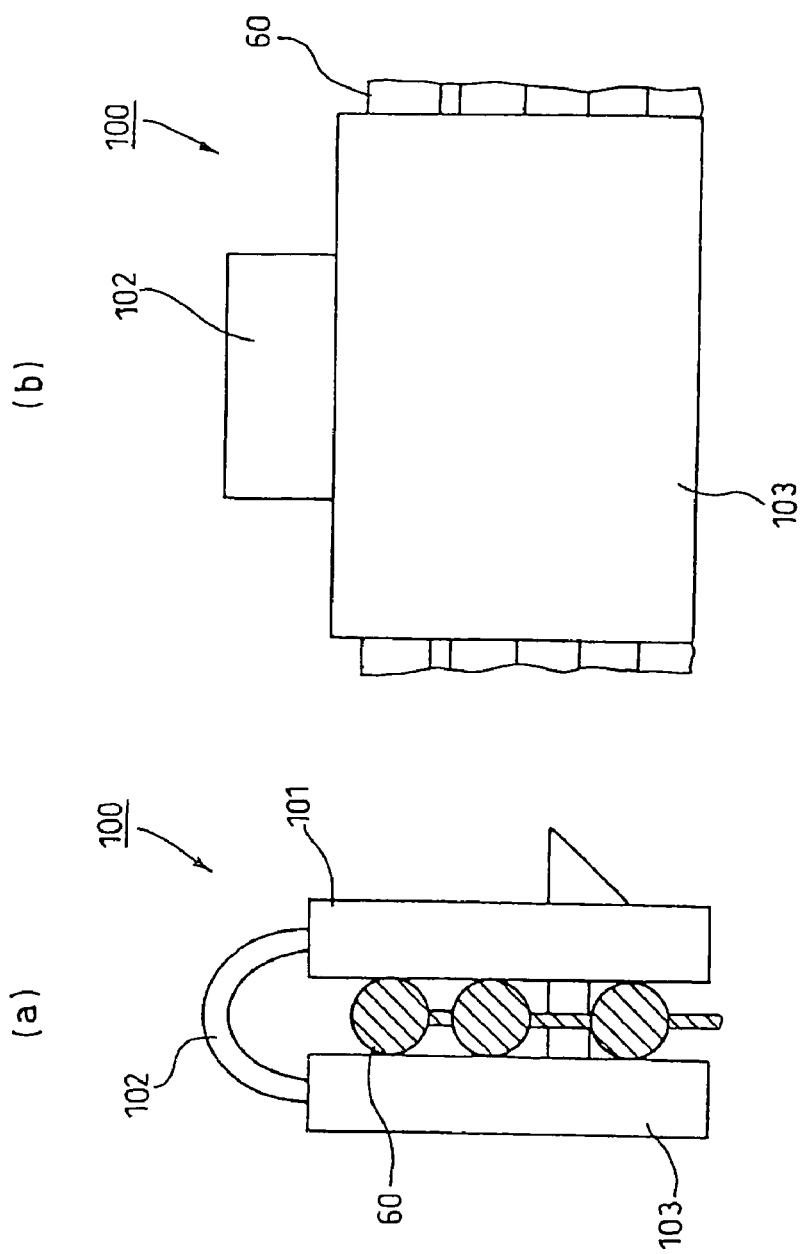
FIG. 6(a) is a schematic side view which shows such a situation that one of 2 covers of the reference example of the flat cable clamp of FIG. 5 engages with a clamp main body.
FIG. 6(b) is a plan view of FIG. 6(a).

Now, at this moment, in order to explain further superiority of the present invention, a reference example is shown in FIGS. 4 through 6(b). FIG. 4 is an external appearance perspective view which shows the reference example of a flat cable clamp in such a situation that its clamp main body and cover are expanded, and FIG. 5 is an external appearance perspective view which shows such a situation that a flat cable is clamped down by the reference example of the flat cable clamp of FIG. 4, and FIG. 6(a) is a schematic side view which shows such a situation that one of two covers in the reference example of the flat cable clamp of FIG. 5 engages with the clamp main body, and then, FIG. 6(b) is a plan view of FIG. 6(a).

As shown in FIG. 4, in a flat cable clamp 100, 2 pieces of covers 103, 103 are coupled through 2 pieces of thin-walled hinges 102, 102 to a clamp main body 101.

As shown in FIG. 5, in the flat cable clamp 100, the flat cable 60 is placed on the clamp main body 101, and thereafter, 2 pieces of the covers 103, 103 are fit up to the clamp main body 101.

However, in the suchlike flat cable clamp 100, thin-walled hinges 102, 102 are simply disposed on the clamp main body 101 in a bared situation, as apparent from FIGS. 6(a) and 6(b), and therefore, there is such a possibility that the thin-walled hinges 102, 102 contact to an external body such as an external electric component and are cut off at the time of using the flat cable clamp 100. In addition, the thin-walled hinges 102, 102 are twisted easily, and its bending direction is not constant, and therefore, even if it is equipped with the thin-walled hinges 102,102 as shown in this reference example, a complicated clamping work by use of the clamp main body 101 is not improved.

In contrast to this, the flat cable clamp 10 of the present invention as shown in FIGS. 1 through 3(b) can not only prevent breakage of the first and second thin-walled hinges 14, 15 but also limit bending directions of the first and second thin-walled hinges 14, 15, as described above.

Meanwhile, the present invention is not limited to the above-described embodiments, but modification, improvement etc. are possible arbitrarily. In addition to that, material quality, shape, dimension, numerical value, configuration, number, location place, etc. of each constituent element are arbitrary and not limited, if they are things which can accomplish the present invention.

For example, it is all right if the number of covers is at least 1 piece. In addition, for example, it is all right if the number of thin-walled hinges is at least 1 piece for 1 cover.

Thus, it is all right if the number of hinge protective protrusions is at least 2 pieces for 1 thin-walled hinge.

What is claimed is:

1. A flat cable clamp for fixing a flat cable, comprising:
   a clamp main body;
   a cover, which is operable to be engaged with the clamp main body;
   a hinge, formed integrally with the clamp main body and the cover, so as to couple the clamp main body and the cover; and
   a plurality of hinge protective protrusions, formed on at least one of the clamp main body and the cover so that the hinge is located between the hinge protective protrusions, and arranged to limit movement of the hinge to a bending direction of the hinge when the cover is engaged with the clamp main body so as to clamp down the flat cable between the cover and the clamp main body.

2. The flat cable clamp according to claim 1, wherein:
   the flat cable clamp fixes the flat cable to a body to be mounted; and
   the clamp main body includes a locking portion which is operable to be fitted in and attached to the body to be mounted.

3. The flat cable clamp according to claim 1, wherein the hinge protective protrusions are respectively disposed in a vicinity of both side edge surfaces of the hinge so as to be opposed to the both side edge surfaces of the hinge.

4. A flat cable clamp for fixing a flat cable, comprising:
   a clamp main body;
   a cover, which is operable to be engaged with the clamp main body;
   at least two hinges, formed integrally with the clamp main body and the cover, so as to couple the clamp main body and the cover; and
   at least three hinge protective protrusions, wherein at least one of the three hinge protective protrusions is disposed between the at least two hinges and arranged to limit movement of the hinge to a bending direction of the at least two hinges.

* * * * *